United States Patent [19]

Normoyle et al.

[11] Patent Number: 5,070,475
[45] Date of Patent: Dec. 3, 1991

[54] FLOATING POINT UNIT INTERFACE

[75] Inventors: Kevin B. Normoyle, Boston; James M. Guyer, Northboro, both of Mass.; Rainer Vogt, Raleigh, N.C.; Anthony S. Fong, Southboro, Mass.

[73] Assignee: Data General Corporation, Westboro, Mass.

[21] Appl. No.: 797,856

[22] Filed: Nov. 14, 1985

[51] Int. Cl.$^5$ ............................................. G06F 13/00
[52] U.S. Cl. ..................................................... 395/375
[58] Field of Search ................ 364/200 MS File, 748, 364/900 MS File

[56] References Cited

U.S. PATENT DOCUMENTS

| | | | |
|---|---|---|---|
| 4,104,720 | 8/1978 | Gruner | 364/200 |
| 4,128,876 | 12/1978 | Ames et al. | 364/200 |
| 4,130,866 | 12/1978 | Ono | 364/200 |
| 4,229,801 | 10/1980 | Whipple | 364/748 |
| 4,395,758 | 7/1983 | Helenius et al. | 364/200 |
| 4,484,259 | 11/1984 | Palmer et al. | 364/754 |
| 4,509,116 | 4/1985 | Lackey et al. | 364/200 |
| 4,547,849 | 10/1985 | Louie et al. | 364/200 |

Primary Examiner—Thomas M. Heckler
Assistant Examiner—Jonathan Fairbanks
Attorney, Agent, or Firm—Robert F. O'Connell

[57] ABSTRACT

A data processing system which includes a floating point computation unit (FPU) which interfaces with a central processing unit (CPU) in which the CPU supplies a dispatch control signal to inform the FPU that it is about to execute a floating point macroinstruction and supplies a dispatch address which includes the starting address of the floating point microinstructions therefor during the same operating cycle that the dispatch control signal is supplied. A buffer memory is provided in the FPU to store the starting address of one decoded macroinstruction while a sequence of microinstructions for a previously decoded macroinstruction is being executed by the FPU. When the buffer already has a starting address resident in its buffer the FPU supplies a control signal to prevent the CPU from supplying a further dispatch address until the buffer is empty. Other control signals for synchronizing the CPU and FPU operations and data transfers are also provided.

12 Claims, 3 Drawing Sheets

FLOATING POINT UNIT INTERFACE

INTRODUCTION

This invention relates to data processing systems having at least a central processing unit (CPU), a main memory unit, and a floating point unit (FPU) and, more particularly, to interface logic required for communication between the CPU and FPU units.

BACKGROUND OF THE INVENTION

Data processing systems utilize fixed point arithmetic logic units (ALUs) for making fixed point, or floating point, arithmetic calculations. Such systems sometimes utilize separate floating point arithmetic calculation units, i.e., units used only for making floating point arithmetic calculations. Usually fixed point arithmetic logic units are arranged to provide integral operation with, i.e., as integrally functioning parts of, the central processing unit, the CPU having essentially direct access to the ALU via internal logic and busses requiring no intermediate interface units for such purpose. Floating point computation units, however, are often formed as entities which are separate from the CPU and require suitable interface logic to permit communication therebetween so that the CPU can use the floating point unit for making the desired floating point calculations. The interface logic must handle the various control signals and data transfers that are necessary in order to control the FPU calculations, as well as to provide the input data to, and the calculated output from, the FPU.

Further, it is usually desirable that such floating point units be permitted to operate in parallel with the operation of the CPU, since the overlapping of activities will increase the overall system performance. Moreover, in asynchronously operated systems the FPU can be arranged to operate at a different operating speed from the speed of operation of the CPU, i.e. such units operate on different internal clock systems. Because of such asynchronous operation, suitable control signals must be devised for coordinating the operation of the FPU with that of the CPU both in the starting of its calculation operations and in the transfer of data in both directions between the units.

SUMMARY OF THE INVENTION

The invention provides interface logic which handles suitable control signals for permitting asynchronous operation of the FPU and the CPU and which achieves a high degree of efficiency by utilizing a unique single level of pipelining macro-instructions for initiating FPU operations.

Suitable control signals are used to permit the transfer of FPU instruction information and to arrange for the proper loading and subsequent use thereof by the FPU. Further control is required to assure that the CPU does not transfer an FPU instruction if the single buffer pipeline at the FPU is full and is unable to accept the loading thereof.

Further appropriate control signals are provided for transfering data in either direction between the CPU data bus and the FPU data bus and for specifying the source and destination of such data. Moreover, appropriate control signals are provided for handling floating point faults which may occur during the calculations being executed by the FPU.

DESCRIPTION OF THE INVENTION

The invention can be described in more detail with the help of the accompanying drawings wherein.

Figure 1:
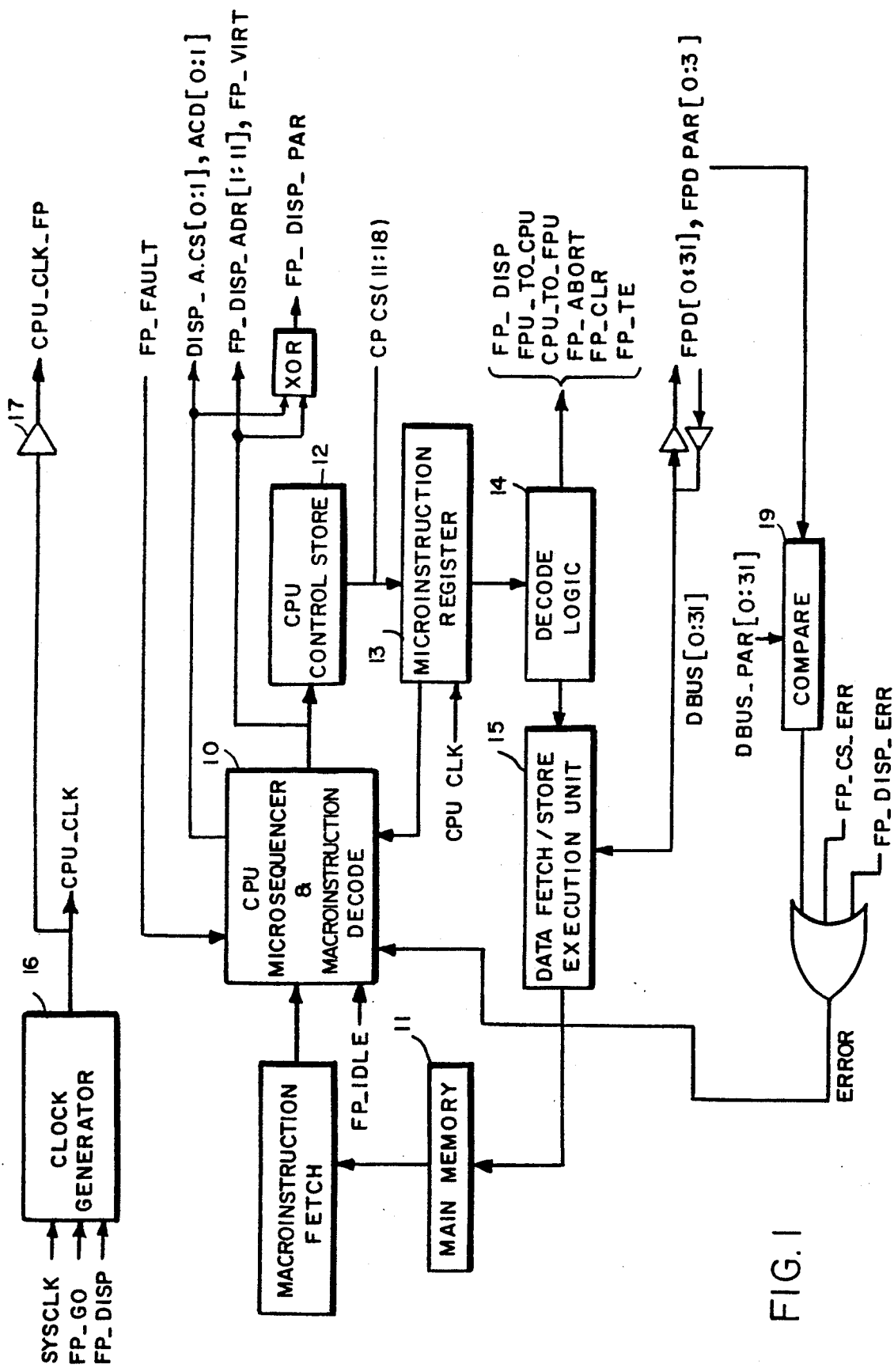
FIG. 1 shows a block diagram of a data processing system and the control signals used with a floating point unit.

In a data processing system in which the floating point unit and the CPU/FPU interface logic operate in accordance with the invention, the system is arranged so that the floating point unit does not require any direct interface to the system main memory in order to obtain its data or instructions nor does the floating point unit require any decoder for decoding those macro-instructions which are required for a floating point operation. All of the data is fetched from main memory by the central processing unit and all of the floating point macro-instructions, which are also fetched by the CPU, are decoded by the CPU so that such data and such decoded macro-instructions (i.e. the operation codes which are obtained by the decoding operation) are supplied to the floating point unit via the floating point interface logic.

Moreover, the floating point unit may be arranged to operate, i.e. to execute its micro-instructions, at a different, and normally faster, speed than the central processing unit, for example, so that it can operate effectively on its own without being synchronously controlled by a central CPU clock system. In such case, while the floating point unit utilizes its own internal clock system for its operation, both the CPU and the FPU base their clocks on a fixed frequency/duty cycle system clock (e.g., called SYS. CLK.).

Thus, in a particular embodiment, for example, the basic micro-cycle of the central processing unit may be 85 nanosecs. (ns.), which microcycle can be made extendable in multiples of 42.5 ns. so that the CPU can operate at such extended microcycle periods. The floating point unit, however, is arranged to use a fixed 85 ns. microcycle at all times, such microcycle not being extendable.

For such operation a basic fixed frequency/duty cycle system clock, operating at a SYS_CLK time perid of 42.5 ns., defines a basic cycle for all system operations, CPU or FPU, such units operating on microcycles that are multiples of the SYS_CLK, the shortest microcycle period being two SYS_CLK periods (85 ns.) for the FPU or for the CPU when operating on an unextended basis. The basic SYS_CLK signal is supplied from a basic system clock to the FPU via the interface.

A further version of a clock signal is supplied from the CPU to the floating point unit as a CPU_CLK_FP clock signal which defines the CPU microcycle and is used to load data and control signals from the CPU to the FPU. The minimum period for the CPU_CLK_FP is 85 ns., extendable in multiples of 42.5 ns. as mentioned above.

In operating with a single level of pipelining of decoded macro-instructions, for a control signal is provided for permitting the FPU to load a starting microinstruction address for a succeeding decoded macro-instruction while the microinstructions for a previous macro-instruction are being executed. In order to supply such starting microinstruction address from the CPU to the FPU pipeline buffer, sometimes referred to as its dispatch buffer, the CPU supplies a control signal FP_DISP. The assertion of such signal informs the FPU that the CPU is about to execute a macro-instruction that affects the FPU. During the same microcycle in which the FP_DISP control signal is supplied, the CPU dispatches (i.e., transfers) the decoded macro-instruction to the FPU. The decoded macro-instruction is in effect represented by a microinstruction address (MIA) having two parts, FP_DISP_ADDR and FP_VIRT. FP_DISP_ADDR is the starting microinstruction address itself and FP_VIRT is a single bit code (e.g., in a particular embodiment MIA may have 13 bits, 12 of which are the address and the least significant bit of which is the FP_VIRT code bit). FP_VIRT is asserted as a "1" in order to place the FPU in an "Idle" state so that the state of the FPU can not change. Such condition then permits the CPU and the FPU to become synchronized, as for data transfer operations, more specifically for an FPU to CPU transfer. When FP_VIRT is a "0" the FPU is permitted to perform the actual execution of the particular microinstruction involved.

The FPU is responsible for keeping the CPU from sending a dispatch when the FPU dispatch buffer is full. The FPU does this by not allowing the CPU to complete its microcycle operation after a dispatch (FP_DISP) unless the FPU is ready to empty the dispatch buffer at the end of the next FPU microcycle. All dispatches from the CPU then must be separated by a non-dispatch CPU microcycle. The FP_GO signal is the control signal which is used by the FPU to control the CPU microcycle operation and when it is not asserted the current CPU microcycle is prevented from being completed. Assertion of the FP_GO control signal informs the CPU that the FPU is finishing the execution of its current macro-instruction and will be able to accept the next decoded macro-instruction's starting microinstruction address which is currently in the dispatch buffer for execution and thereby leave the dispatch buffer available for the still next decoded macro-instruction from the CPU. The CPU may then load the dispatch buffer as early as the next CPU microcycle.

Such pipelining operation permits the FPU to perform the execution of its current micro-instructions at its own operating speed. When it has finished such execution, the FPU has the next FPU decoded macro-instruction immediately available. Such control signals, i.e. the FP_DISP and FP_GO signals permit the CPU and FPU operations to be coordinated for the dispatching of further decoded macro-instructions into the dispatch buffer from the CPU. The FPU and the CPU operations are so coordinated even though their speeds of operation are different, i.e. they may be operating with different microcycle periods. The FPU can thereby operate in parallel with the CPU without having to force the CPU to suspend its own operation and to wait until a floating point operation has been completed before the CPU can perform non-FPU operations.

In order to execute a decoded macro-instruction with the data required for such purpose, such data is obtained from the system memory via the CPU and is supplied by the CPU to the FPU via the FPU interface logic so that the FPU itself is not required to use further interface logic for directly accessing the system memory. In transferring data to the FPU, the CPU indicates to the FPU that it is driving such data from its own data bus (DBUS) to the floating point data bus (FPD) by providing a CPU_TO_FPU control signal. One microcycle before applying such control signal, the CPU supplies a prior control signal, CP_CS, which is asserted during the previous CPU_CLK_FP microcycle, the prior control signal including selected bits for specifying the destination in the FPU to which the data is to be transferred.

Similarly when the FPU has finished the execution of a floating point instruction and is ready to transfer the resulting data to the CPU, and the latter is ready to accept it, the CPU supplies an FPU_TO_CPU control signal to indicate that the FPU is driving data from its floating point data bus to the CPU data bus. The source of such data is also specified by a CP_CS control signal which is asserted during the previous CPU_CLK_FP microcycle.

If the CPU initiates a data transfer from the CPU to the FPU and the CPU then discovers that the data is not yet available for such transfer, the CPU sends an FP_ABORT control signal which signal is then stored by the FPU and forces the FPU into an "Idle" state so that the FPU's operation is temporarily suspended (when it looks for the data the CPU was trying to send). When the FPU is in such an idle state it informs the CPU thereof by the assertion of an FP_IDLE control signal. When the CPU has the data available, the FPU is then in a condition for again accepting the instruction for which the data is needed and the CPU restarts the instruction by sending a new FP_DISP control signal for such purpose. The FP_DISP/FP_GO interface control signals assure that if two instructions send data to the same destination, the second transfer doesn't occur until after the first data is used.

When a decoded macro-instruction is dispatched to the FPU, appropriate identification of the accumulators from which data is sent or received is necessary. Such identification is indicated by the assertion of the DISP_ACS (source accumulator) and the DISP_ACD (destination accumulator) control signals. Both the latter control signals are valid when the FP_DISP signal has been asserted.

An appropriate parity bit of a dispatched word is provided by the CPU so that odd parity is maintained and is identified by the FP_DISP_PAR bit. If the FPU detects a parity error on the set of signals FP_DISP_ADDR, DISP_ACS and DISP_ACD after the assertion of an FP_DISP by the CPU, the FPU will send an FP_DISP_ERR signal and will thereupon stop its operation. Such condition can only be cleared by the assertion of an FP_CLR signal from the CPU.

A fault may occur in the operation of the floating point unit. For example, during a floating point operation the FPU may detect that an exceptional condition, such as an exponent overflow or underflow condition in the floating point computation has occurred and thereupon supplies an FP_FAULT signal to the CPU. The CPU must then be made available for examining the floating point fault condition. It can only be available for such purpose when it is not otherwise performing an operation during which the CPU cannot be interrupted. The CPU supplies an FP_TE control signal when it is in a condition such that it can examine a floating point fault. Thus, if a fault occurs in the floating point unit and FP_TE is asserted by the CPU, the floating point unit transfers its FP_FAULT condition control signal to indicate that the FPU has detected a fault and the CPU then knows that an actual fault has occurred and enters into a "fault handling" state.

Upon the assertion of an FP_FAULT control signal, the FPU enters an "idle fault" state which causes the floating point unit to ignore any subsequent dispatching of decoded macro-instructions to the FPU and to ignore any microinstruction address which is in the dispatch buffer. The floating point unit can only be removed from its "idle fault" state upon the assertion of an FP_ABORT signal by the CPU which causes the FPU to be forced into its normal "idle" state in which it can again accept dispatches from the CPU.

In addition to restarting the FPU following the handling of a fault the FP_CLR signal is supplied by the FPU to initialize or to reset the operation of the FPU as well as the FPU_CPU interface control state.

Further bi-directional data signals which are transmitted between the CPU and the FPU include an FPD signal which is a multi bit bi-directional signal transferred on a dedicated bus connecting the FPU data bus to the CPU data bus for all data transfers therebetween. As described above, the transfer of such data is controlled by the assertion of the CPU_TO_FPU, the FPU_TO_CPU and the CP_CS control signal.

In addition, bi-directional parity information is supplied by the FPD_PAR signal, a multi bit signal transferred on a dedicated bus for showing byte parity for the FPD signal. The FPD_PAR signal bits are maintained on transfers of data in either direction with the parity check always being performed by the CPU. Such bits are generated to maintain odd parity across selected groups of bits of the overall data bit combination.

FIG. 1 depicts a data processing system as arranged for providing control signals for use with an FPU unit in which a microsequence and decode unit 10 decodes a macroinstruction which has been fetched from main memory unit 11 and provides a sequence of microinstructions. Such unit produces the DISP_ACS [0:1], ACD [0:1], the FP_DISP_ADR [1:11], the FP_VIRT control signal and, via an XOR unit 12, the FP_DISP_PAR control signal. The microsequencer obtains the sequence of microinstructions from control store 13, producing the CP_CS [11:18] control signal. Each microinstruction is clocked into microinstruction register 13 which is then decoded by decode logic 14 for execution by the Data Fetch/Store Execution Unit 15. During an FPU operation the decoding produces as appropriate, the FP_DISP, FPU_TO_CPU, CPU_TO_FPU, FP_ABORT, FP_CLR AND FP_TE control signals.

A system clock generation unit responds to a SYS_CLK to produce the CPU_CLK signal via buffer 17, the CPU_CLK_FP clock signal. Data is supplied via data bus 18 either to or from the FPU, identified as DBUS [0:31] data when used by the CPU and as FPD [0:31] when transferred between the CPU and FPU.

The FP_FAULT control signal received from the FPU is supplied to the microsequencer 10 to be used in providing a fault handler micro-routine for handling the FPU fault condition, in a well-known manner. The FPD_PAR [0:3] bits from the PFU are compared with the data parity bits DBUS_PAR [0:3] in comparator unit 19. If the comparisons are not equal (=) an error is identified as existing. If either the FP_CS_ERR or the FP_DISP_ERR is supplied from the FPU, an error is similarly identified as existing. The presence of any of the above errors is made known to the microsequencer to cause an error handling micro-routine to be involved in a well-known manner. Further, the FP_IDLE control signal is supplied to microsequencer 10 to inform the CPU that the FPU is in an idle state waiting data from the CPU.

Figure 2:
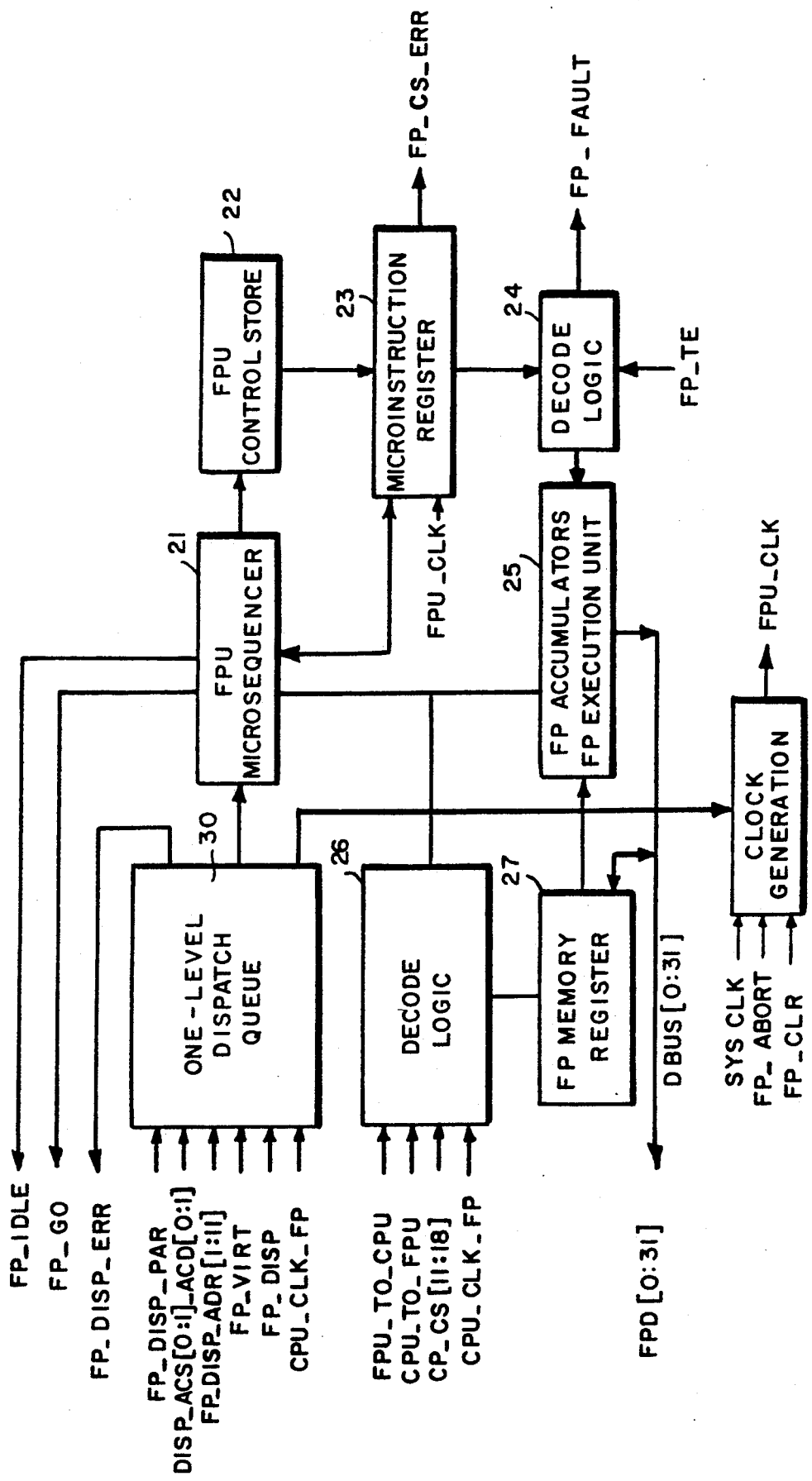
FIG. 2 shows a block diagram of a floating point unit and the corresponding control signals as used with the system of FIG. 1.

FIG. 2 shows the FPU in block diagram form including the dispatch queue registers 20 for supplying a starting microaddress to the FPU microsequencer and for receiving the appropriate control signals from the CPU as shown. The FPU microsequencer 21 obtains the sequence of FPU microinstructions from control store 22 which are supplied to the microinstruction register 23 and are then decoded by decode logic 24 as is well known. The decoded microinstruction is supplied to the FPU execution unit and accumulators 25. The data required for the floating point computation is clocked from the CPU via Decode Logic 26 and memory register 27 for use by the execution unit 25, the result being supplied as FPD [0:31] to the CPU. The FPU_IDLE and FP_GO control signals are supplied to the microsequencer 21. Other controls are supplied as shown.

Figure 3:
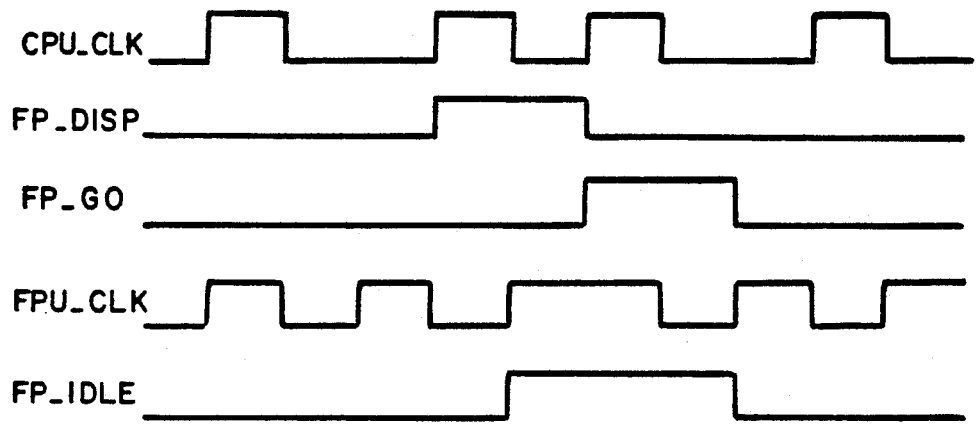
FIGS. 3, 4 and 5 show exemplary timing diagrams depicting typical timing relationships among the control signals of FIGS. 1 and 2 for the various operations depicted therein.
Figure 4:
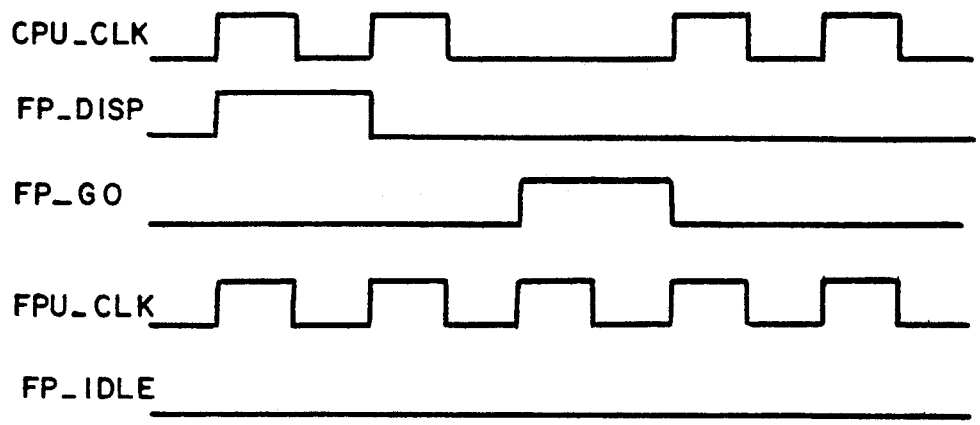
Figure 5:
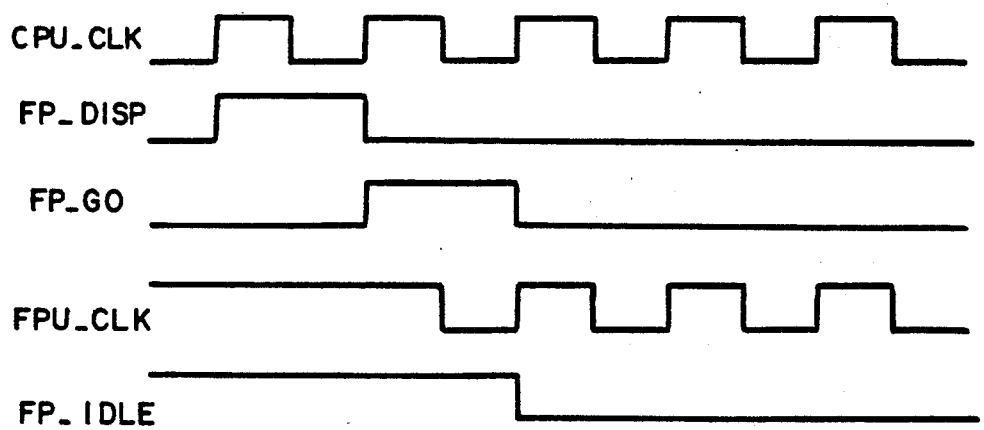

FIG. 3 shows a timing diagram of the relationships among the FP_DISP, FP_GO, FPU_CLK, CPU_CLK and FP_IDLE clock and control signals when the CPU and FPU operation asynchronously. In the example given the FPU is inoperative (i.e., is "idle") for 1½ cycles (The FP_IDLE signal is asserted) because the dispatch queue is not loaded. FIG. 4 shows such relationships for an exemplary situation in which the CPU is dispatching from a busy to busy condition. In FIG. 4 the CPU is held waiting (the CPU_CLK is not asserted) for the assertion of the FP_GO signal while the FPU has no wasted clock cycles. In FIG. 5, the CPU is dispatching from an idle to busy state. The FPU takes one cycle after FP_GO has been asserted to fetch a microinstruction after the dispatch queue is loaded.

The invention as described above permit asynchronous operation of the FPU and CPU and by utilizing the single level pipe-lining of FPU instructions and the use of the aforesaid control signals achieves a relatively high degree of efficiency of FPU operation.

What is claimed is:

1. A data processing system which includes a central processor unit (CPU) and a floating point unit (FPU) for making floating point computations wherein said CPU comprises means for decoding a floating point macroinstruction to provide a starting microinstruction address for use by said FPU to produce a sequence of FPU microinstructions;

means for supplying a dispatch control signal to inform the FPU that the CPU is about to execute said floating point macroinstruction;

means for supplying a dispatch address which includes a starting microinstruction address of a decoded macroinstruction to said FPU during the same operating cycle that said dispatch control signal is supplied to said FPU;

said FPU comprises buffer memory means for storing the dispatch address of one decoded macroinstruction received from said CPU while a sequence of microinstructions of a dispatch address previously received by said FPU and previously stored in said buffer memory means is being executed by said FPU; and further wherein said CPU further includes means for providing a first data transfer control signal for informing the FPU that data is being transferred to the FPU from said CPU and for providing a second data transfer control signal for informing the FPU that data is being transferred to the CPU from said FPU.

2. A data processing system in accordance with claim 1 and wherein said CPU includes means for supplying an abort control signal to said FPU when data to be transferred is not available for said transfer and further wherein said FPU includes means responsive to said abort control signal to place said FPU in an idle state of operation.

3. A data processing system in accordance with claim 2 wherein said FPU further includes means for supplying an idle control signal to said CPU to inform the CPU that it is in an idle state of operation.

4. A data processing system in accordance with claim 1 and further including means for providing a source/destination control signal one cycle of operation before the assertion of said first or second data transfer control signals to identify the destination or source in the FPU of the data being transferred.

5. A data processing system which includes a central processor unit (CPU) and a floating point unit (FPU) for making floating point computations wherein said CPU comprises means for decoding a floating point macroinstruction to provide a starting microinstruction address for use by said FPU to produce a sequence of FPU microinstructions;

means for supplying a dispatch control signal to inform the FPU that the CPU is about to execute said floating point macroinstruction;

means for supplying a dispatch address which includes a starting microinstruction address of a decoded macroinstruction to said FPU during the same operating cycle that said dispatch control signal is supplied to said FPU;

said FPU comprises buffer memory means for storing the dispatch address of one decoded macroinstruction received from said CPU while a sequence of microinstructions of a dispatch address previously received by said FPU and previously stored in said buffer memory means is being executed by said FPU; and further wherein said dispatch address further includes a selected bit which when it is in a first selected state places the FPU in an idle state to permit the FPU and CPU to become synchronized to permit data transfer operations therebetween.

6. A data processing system in accordance with claim 5 wherein, when said selected bit is in a second selected state, said FPU is permitted to execute microinstructions.

7. A data processing system which includes a central processor unit (CPU) and a floating point unit (FPU) for making floating point computations wherein said CPU comprises means for decoding a floating point macroinstruction to provide a starting microinstruction address for use by said FPU to produce a sequence of FPU microinstructions;

means for supplying a dispatch control signal to inform the FPU that the CPU is about to execute said floating point macroinstruction;

means for supplying a dispatch address which includes a starting microinstruction address of a decoded macroinstruction to said FPU during the same operating cycle that said dispatch control signal is supplied to said FPU;

said FPU comprises buffer memory means for storing the dispatch address of one decoded macroinstruction received from said CPU while a sequence of microinstructions of a dispatch address previously received by said FPU and previously stored in said buffer memory means is being executed by said FPU; and further wherein said CPU supplies a parity control signal to said FPU when a dispatch address is supplied by the CPU to said FPU and the FPU includes means responsive to said parity control signal to detect a parity error in said dispatch address and for supplying a parity error control signal to said CPU and for placing the FPU in a non-operating condition when a parity error has been detected.

8. A data processing system in accordance with claim 7, said CPU further includes means for supplying a clear control signal to said FPU, said FPU remaining in its non-operating condition until said clear control signal is asserted by said CPU.

9. A data processing system which includes a central processor unit (CPU) and a floating point unit (FPU) for making floating point computations wherein said CPU comprises means for decoding a floating point macroinstruction to provide a starting microinstruction address for use by said FPU to produce a sequence of FPU microinstructions;

means for supplying a dispatch control signal to inform the FPU that the CPU is about to execute said floating point macroinstruction;

means for supplying a dispatch address which includes a starting microinstruction address of a decoded macroinstruction to said FPU during the same operating cycle that said dispatch control signal is supplied to said FPU;

said FPU comprises buffer memory means for storing the dispatch address of one decoded macroinstruction received from said CPU while a sequence of microinstructions of a dispatch address previously received by said FPU and previously stored in said buffer memory means is being executed by said FPU; and further wherein said CPU is arranged to use a CPU system timing signal having a first selected time period of operation and said FPU is arranged to use an FPU system timing signal having a second selected time period of operation which is different from said first selected time period.

10. A data processing system which includes a central processor unit (CPU) and a floating point unit (FPU) for making floating point computations wherein said CPU comprises means for decoding a floating point macroinstruction to provide a starting microinstruction address for use by said FPU to produce a sequence of FPU microinstructions;

means for supplying a dispatch control signal to inform the FPU that the CPU is about to execute said floating point macroinstruction;

means for supplying a dispatch address which includes a starting microinstruction address of a decoded macroinstruction to said FPU during the same operating cycle that said dispatch control signal is supplied to said FPU;

said FPU comprises buffer memory means for storing the dispatch address of one decoded macroinstruction received from said CPU while a sequence of microinstructions of a dispatch address previously received by said FPU and previously stored in said buffer memory means is being executed by said FPU; and further wherein said FPU includes means for providing an FPU control signal which, when it is asserted by the FPU, informs the CPU that the FPU is finishing the execution of the current FPU macroinstruction and is capable of receiving a new dispatch address in its buffer memory means and which, when it is not asserted by the FPU, prevents the CPU from supplying a new dispatch address to the FPU buffer memory means.

11. A data processing system which includes a central processor unit (CPU) and a floating point unit (FPU) for making floating point computations wherein said CPU comprises means for decoding a floating point macroinstruction to provide a starting microinstruction address for use by said FPU to produce a sequence of FPU microinstructions;

means for supplying a dispatch control signal to inform the FPU that the CPU is about to execute said floating point macroinstruction;

means for supplying a dispatch address which includes a starting microinstruction address of a decoded macroinstruction to said FPU during the same operating cycle that said dispatch control signal is supplied to said FPU;

said FPU comprises buffer memory means for storing the dispatch address of one decoded macroinstruction received from said CPU while a sequence of microinstructions of a dispatch address previously received by said FPU and previously stored in said buffer memory means is being executed by said FPU; and further wherein said CPU includes a main memory and means for transferring data to and from said main memory, said FPU being permitted to access the main memory only via the CPU's data transferring means.

12. A data processing system which includes a central processor unit (CPU) and a floating point unit (FPU) for making floating point computations wherein said CPU comprises means for decoding a floating point macroinstruction to provide a starting microinstruction address for use by said FPU to produce a sequence of FPU microinstructions;

means for supplying a dispatch control signal to inform the FPU that the CPU is about to execute said floating point macroinstruction;

means for supplying a dispatch address which includes a starting microinstruction address of a decoded macroinstruction to said FPU during the same operating cycle that said dispatch control signal is supplied to said FPU;

said FPU comprises buffer memory means for storing the dispatch address of one decoded macroinstruction received from said CPU while a sequence of microinstructions of a dispatch address previously received by said FPU and previously stored in said buffer memory means is being executed by said FPU; and further wherein said FPU supplies a fault control signal to said CPU when a fault condition occurs in a floating point computation being performed by said FPU; and said CPU includes means for supplying a fault examination control signal when said CPU is in a condition such that it can examine said FPU fault condition in order to handle said fault condition.

* * * * *